(12) United States Patent
Babacan (10) Patent No.: US 6,827,005 B2
(45) Date of Patent: Dec. 7, 2004

(54) INTEGRATED COOKING AND CUTTING INSTRUMENT FOR FAST FOOD DONER KEBAB AND METHOD THEREFOR

(76) Inventor: Ayhan Babacan, Karanfil Cud 27, Lovent, Istanbul (TR), 80020

( * ) Notice: Subject to any disclaimer, the term of this patent is extended or adjusted under 35 U.S.C. 154(b) by 0 days.

(21) Appl. No.: 10/113,695

(22) Filed: Mar. 29, 2002

(65) Prior Publication Data

US 2002/0176920 A1 Nov. 28, 2002

Related U.S. Application Data

(63) Continuation-in-part of application No. 09/530,177, filed as application No. PCT/TR98/00007 on Apr. 3, 1998, now Pat. No. 6,582,744.

(51) Int. Cl.[7] .............................................. A22C 7/00
(52) U.S. Cl. .............................. 99/326; 99/334; 99/349; 99/353; 99/355; 99/393; 99/430; 99/443 R
(58) Field of Search ....................... 99/355, 326, 329 P, 99/331, 334, 349, 352, 353, 393, 430, 443 R (56) References Cited

U.S. PATENT DOCUMENTS

| | | | | |
|---|---|---|---|---|
| 1,358,365 A | * | 11/1920 | De Matteis | ................... 99/391 |
| 4,300,443 A | * | 11/1981 | Morcos et al. | ................. 99/332 |
| 6,582,744 B1 | * | 6/2003 | Babacan | ..................... 426/513 |

FOREIGN PATENT DOCUMENTS

| | | | |
|---|---|---|---|
| DE | 20008906 U1 | * | 8/2000 |
| FR | 2572894 | * | 11/1984 |
| GB | 2218327 A | * | 11/1989 |
| GB | 2271274 A | * | 4/1994 |
| GB | 2294195 A | * | 4/1996 |
| NL | 8100241 A | * | 8/1982 |
| NL | 1013977 C6 | * | 7/2001 |

* cited by examiner

Primary Examiner—Drew Becker
(74) Attorney, Agent, or Firm—Orum & Roth (57) ABSTRACT

An automated broiling and cutting device for the production of cooked Doner meat. A rotating unit carries meat containers for holding Doner meat to be cooked. The meat containers rotate about the broiling units and the cutting unit. Automated control of cooking and cutting is performed via a central control and adjustment panel.

18 Claims, 7 Drawing Sheets

INTEGRATED COOKING AND CUTTING INSTRUMENT FOR FAST FOOD DONER KEBAB AND METHOD THEREFOR

This application is a continuation-in-part of application Ser. No. 09/530,177, filed Apr. 20, 2000, now U.S. Pat. No. 6,582,744 which is a national stage of international application No. PCT/TR98/00007, filed Apr. 3, 1998.

BACKGROUND OF THE INVENTION

1. Field of the Invention

The present invention relates to a method for obtaining cooked meat, for example, Doner meat, within the speed, hygienic conditions, form and standards required by a fast food system and an integrated meat broiling and cutting instrument for achieving this method.

2. Description of the Related Art

The field of the invention and the manual technique for making Turkish Doner Kebab is known. In the conventional method a grill bar, usually vertical, dressed with Doner material of meat and minced meat, is rotated on its vertical axis in front of a cooker and the broiled parts of the meat is manually cut by a human operator using a knife in a vertically downward fashion.

According to said method, rotation of the meat cylinders arranged around the grill bar in the said order were tried in different ways, namely, vertically and horizontally, different types of cookers were tried, electrical knives were used for cutting but no alternative solution or modification could be provided for the traditional way of rotating the meat on the grill axis in front of a cooker and cutting the broiled parts by a human operated knife. The most improved variation of the traditional method comprises the preparation and freezing of the blocks of meat at a central place and transmitting the frozen meat blocks to the cooking station, and using electrical knives in cutting the broiled meat. Presently, there is no method or instrument, known or used, both for broiling and cutting Doner meat in the same amount and form, ready to serve, without human intervention.

Publications representing the State-of-the-Art are the British Patent No 2,218,327—MICHAEL ZANNETOS, British Patent No 2,271,274—MUSTAFA KAYA TUREDI, European Patent Application No 85300967,8—OZORAN LIMITED, and as it is known from all of these documents, the Doner meat to be cooked is aligned in a row around a single grill bar and a single bar of meat is rotated in front of a single cooker. The cooked meat is cut off by a human operated knife or various other cutting tools, thus made ready to serve. Neither of the above publications comprises the act of putting ready-to-cook meat into boxes and depending on the preferences or needs, placing 5, 6 or 8 meat boxes onto a rotating carrier chassis and rotating all of them together around 4, 5 or 7 separate cookers, thus progressively broiling the meats inside the boxes without human intervention and cutting them into ready-to-service Doner meat of the same standard cooking degree and amount within a predetermined time.

Therefore, as a result of the presently known technique, standard form or standard weight has never been achieved in obtaining cooked and ready-to-serve Doner meat. The process of rotating and cutting could not be automated and they were carried on by a human and/or a human operated knife. The speed of obtaining cooked meat has been limited to the broiling speed of the meat in a single block, and standardization, speed and practicality of a fast food system could not be obtained. The hygienic conditions, left only to the operator, were far from being consistently clean.

SUMMARY OF THE INVENTION

The present invention provides the automation and standardization required in a fast-food system as described herein below; all of the parts constituting the integrated broiling and cutting device of the invention are controlled by motors directed from a central control panel and they can be operated in co-operation and as a whole in an automatic way, and the integrated broiling and cutting device could be adjusted to obtain the desired amount of meat at a desired broiling rate. As a result, all of the operations, either in small businesses or big ones could be carried out without direct human intervention and the broiled and cut meat is obtained in a standard form and weight.

The integrated Doner cooking and cutting device of the invention comprises separate units each carrying out a different operation:

1) Meat Containers
2) Broiling unit
3) Rotating Unit
4) Cutting unit
5) Central control and adjustment panel.

BRIEF DESCRIPTION OF THE DRAWINGS

Parts making up the integrated Doner broiling and cutting device of the invention and their connection are shown in the enclosed figures in which.

DETAILED DESCRIPTION

1-Meat Containers

Figure 1:
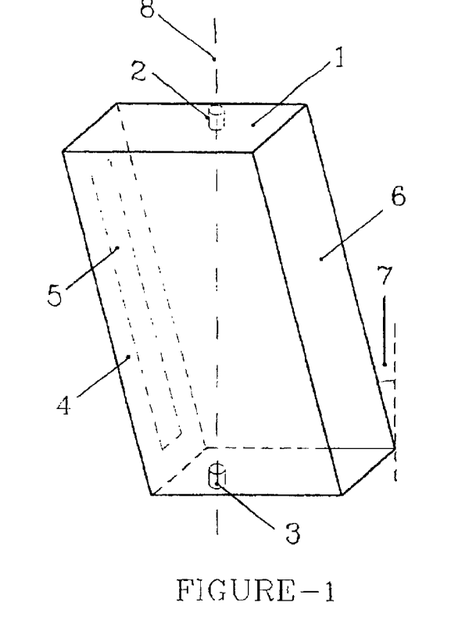
FIG. 1—Is a perspective view of the meat container (1) from the front quarter.
Figure 2:
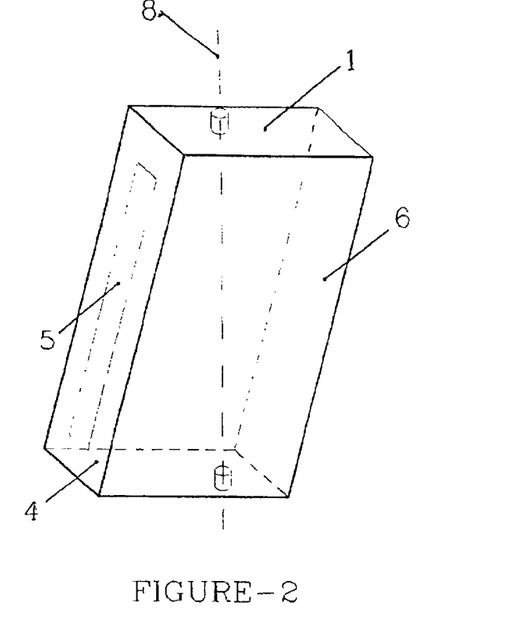
FIG. 2—Is a perspective view of the meat container (1) from the rear quarter.
Figure 3:
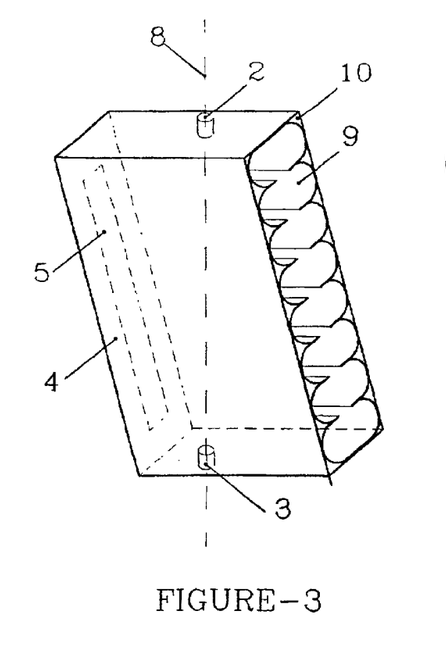
FIG. 3—Is a perspective view of the meat container (1) from the front quarter with interior wall.
Figure 4:
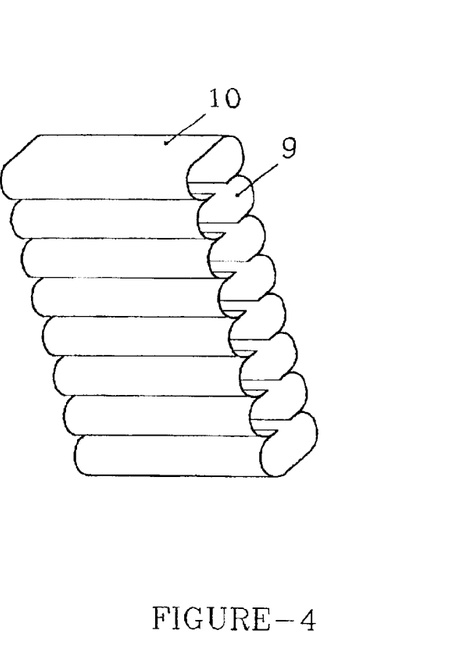
FIG. 4—Is a perspective view of the interior wall (10) consisting of the socket (9) where the meat blocks are placed.
Figure 5:
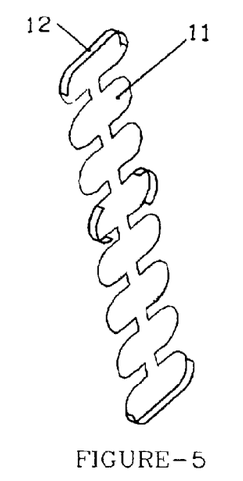
FIG. 5—Shows the movable pushing plate (11) containing horizontal additional parts (12) and of which the side surface is similar to the edge of the interior wall to maintain the inclination and to prevent turning and failing.
Figure 6:
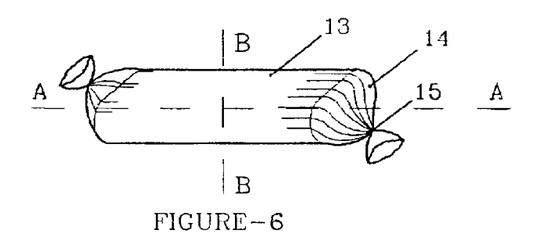
FIG. 6—Shows a meat block which has been stuffed into a polyamide film tube (14) at the meat factory. The polyamide film tube (14), is closed at both ends (15) at the meat factory and frozen in the form of the socket (9) for transport to the location of use in refrigerated boxes.
Figure 7:
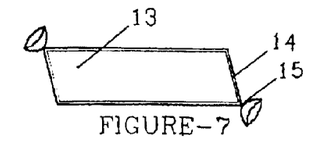
FIG. 7—Shows as a cross-section on A—A of the meat block of FIG. 6.
Figure 8:
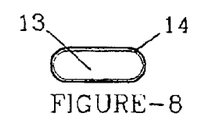
FIG. 8—Shows as a cross section B—B of the meat block of FIG. 6.
Figure 9:
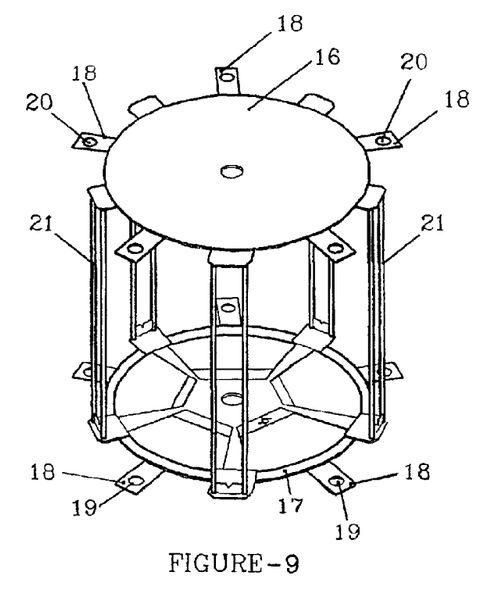
FIG. 9—Shows the carrier chassis forming the rotating group where the meat container (1) is seated which can be configured as, for example, a pentagon, hexagon or octagon.
Figure 14:
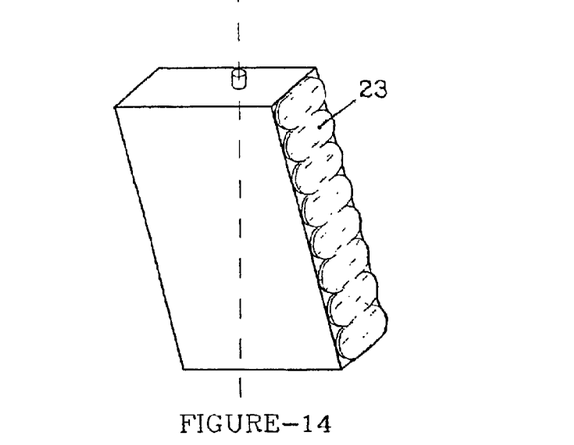
FIG. 14—Shows the cooked meat block pushed forward in order to be cut as one slice (23).
Figure 15:
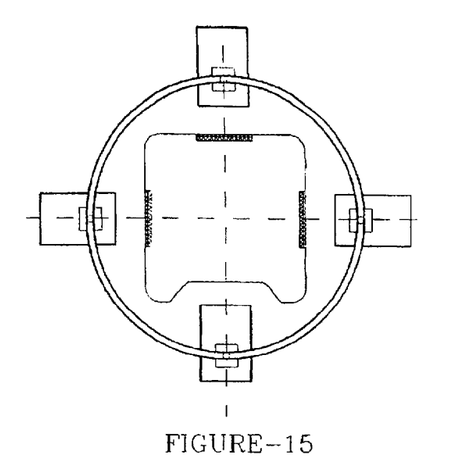
FIG. 15—Shows a top view of a configuration layout of an instrument square configured with 3 cooker stations and a cutting station without cooker.

Meat containers are prismatic rectangular boxes (FIG. 1) produced from, for example, stainless steel with an inclination preferably 5–15° (7) from the vertical axis. Meat containers are preferably 15 cm×50 cm with 30 cm depth with an open front side. In the meat containers, there are pins (2–3) ensuring that the containers are seated on the bottom and upper table and rotate around its axis. There is an internal wall (10) made of, for example, stainless steel within the prismatic rectangular box forming the divisions (sockets) within which the frozen meat block will be placed. At the meat processing center, meat blocks frozen according to the form of the socket (9) of the meat container (FIG. 6) are packed in polyamide bags in automatic filling-stuffing machines. At the closed back part of the containers, there is a split (5) where the pistons which push the pushing plate fit in. The pushing plate (11) is constructed so that it can go back and forth within the internal wall with the same inclination (FIG. 5). The pushing plate has horizontal extension parts on its bottom and upper edges (12) to eliminate falling and rotating risks. When the frozen meat blocks are placed in the meat sockets, the pushing plate (11) at the back of the container is pushed by the pistons in increments as thick as a slice (FIG. 14) and ensures that the cooked parts of meat blocks are made ready for cutting.

2-Cooker Unit (Cooker Set)

Figure 10:
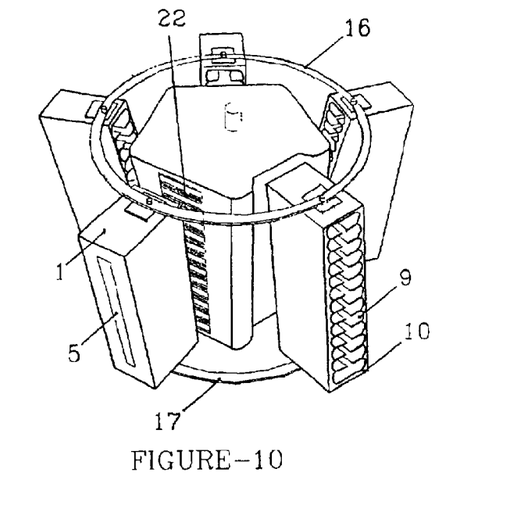
FIG. 10—Shows five meat containers (1) placed on top of the pentagonal lower frame (17) of the rotating group's carrier chassis with 5–15° inclination. The meat container at the front, has its open front face turned outwardly in order to slice the cooked meat block.
Figure 11:
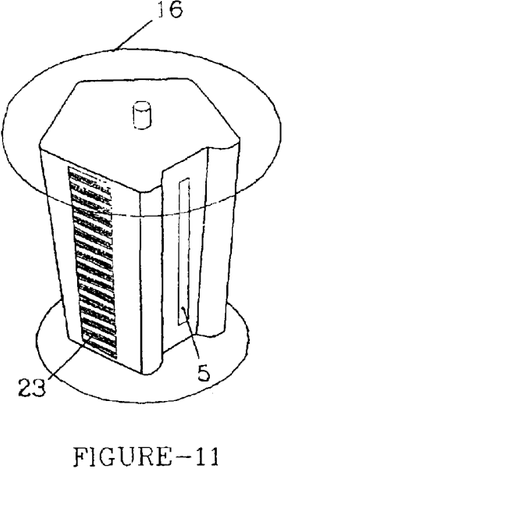
FIG. 11—Shows cutting station of the instrument which has a split where the pistons to push the pushing plate will go into (5).
Figure 12:
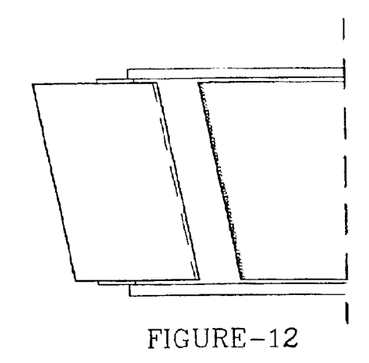
FIG. 12—Shows a side cross-section of the meat container at the cooking position.
Figure 13:
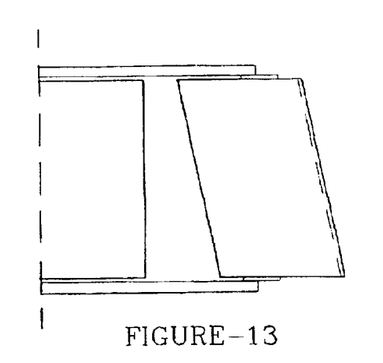
FIG. 13—Shows a side cross-section of the meat container at the cutting station.
Figure 20:
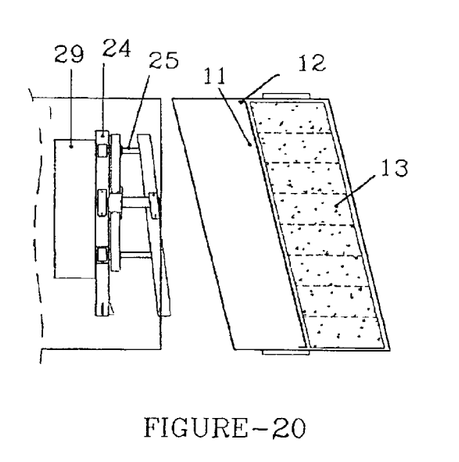
FIG. 20—Shows the cross-section layout of the meat container where the meat block previously cut returns to the cutting station for the next turn.
Figure 21:
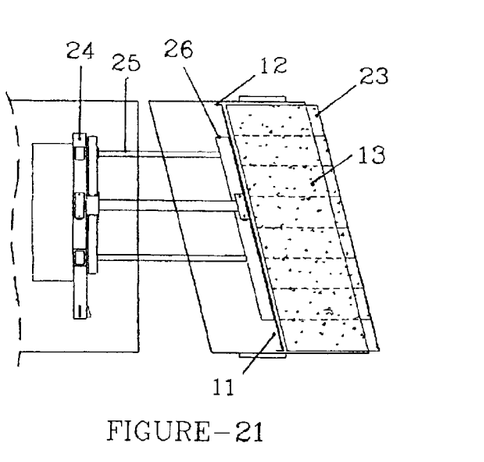
FIG. 21—Shows a side cross-section of the meat container where the cooked meat blocks are pushed by the inclined pushing piston in order to be cut as one slice.

The cookers (22) of the cooker set (FIG. 10) that have been placed in a reverse conical form of the fixed support (29) in the center of the system are, in contrary to the meat container, may be preferably fixed in an inclination of approximately 80 degrees to the vertical axis. Each cooker set has a cutting station (FIG. 11). In the pentagonal system there are 4 cookers and one cutting station. There is no inclination at the cutting stations, they have been designed so that they do not hinder the turning of the meat container. The meat containers containing the meat blocks turn sequentially in front of the cookers, and when the cooking process is finished, it comes to the cutting station and it turns 180 degrees around its own axis (FIG. 10). At the end of this turning, the rear side of the containers that are closed, will be opposite the pistons (FIG. 20). There is a piston group at the cutting station without cookers, which has connected arms (25) that push the pushing plate (FIG. 21) behind the meat blocks and moves the cooked meat parts (23) outside the container.

The cookers on the cooker set (22) are, for example, LPG or radian cookers. Each cooker will provide a cooking heat that can be selected and adjusted from the Central command table (FIG. 26), according to the cooking heat stage.

3-Rotation Set

Figure 22:
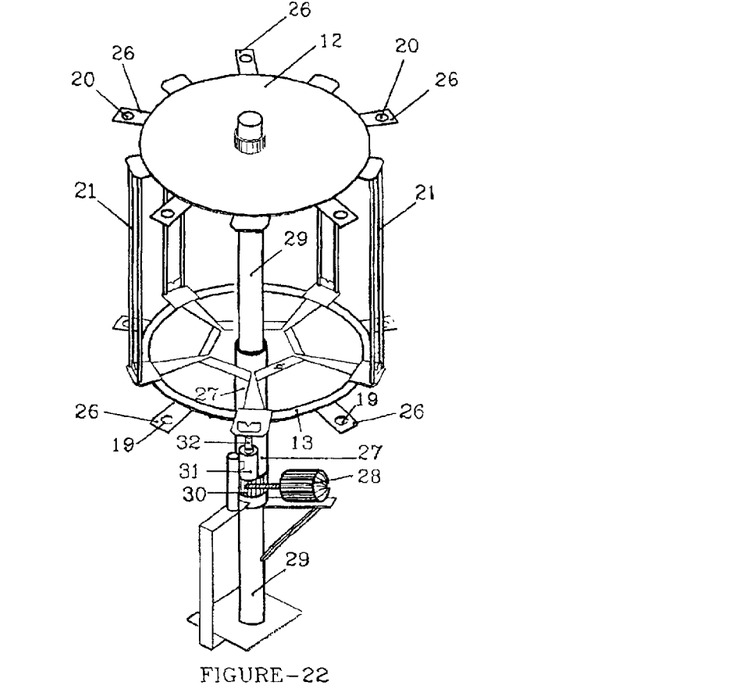
FIG. 22—Shows the motor, endless screw and the reducer units carrying the meat containers and enabling the rotation of top and bottom tables.
Figure 23:
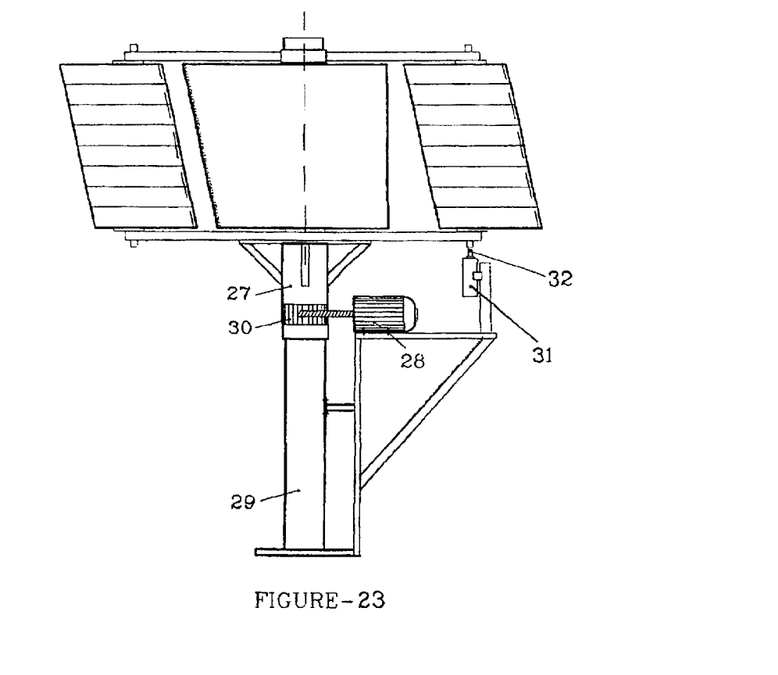
FIG. 23—Shows the rotary actuator and locking mechanism (32) which enables the meat containers to rotate 180° in their own axis as well as enabling rotation of motor, endless screw and reducer units.
Figure 24:
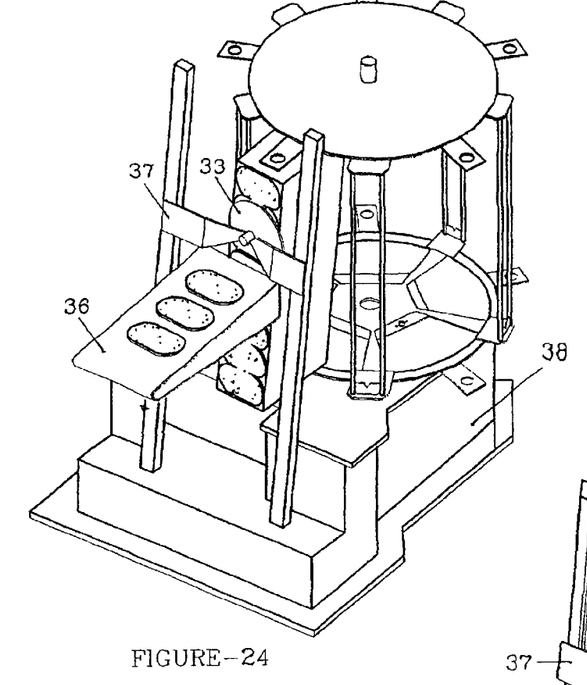
FIG. 24—Shows the circular knife and the slicing process.
Figure 25:
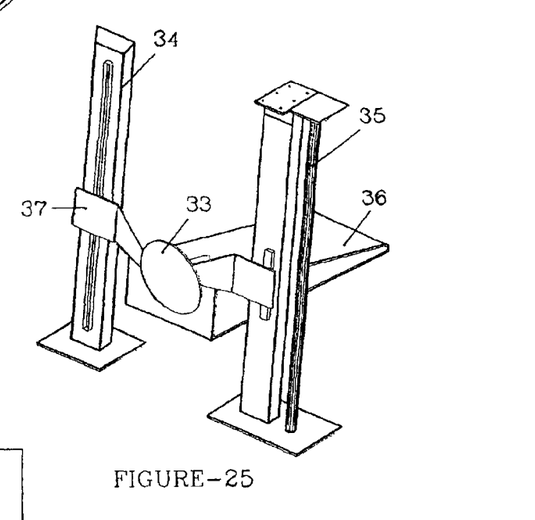
FIG. 25—Shows the up and down movement and bearing mechanism of the circular knife via side linear and bearing cylinders.

The rotation set (FIG. 22), consists of the main axis (27), carrying tables (16–17), and the meat container rotation group (FIG. 22). The rotation group is installed inside the machine body. The drive of the main axis of the rotation group has been designed to use an electrical motor (28). Here, an asynchronous motor has been used and inductive sensors provide positioning feedback. At the same time, the motor group has been connected to the fixed central main support (29). A reduction device (30) with an endless screw mechanism has been placed at the motor outlet. At the cutting station there is a mechanism (FIG. 23) that allows a 180 degrees rotation of the meat containers around their vertical axis. The mechanism has been placed on the bottom part of the machine body. The 180 degrees rotational movement of the meat containers is provided by a rotary actuator (31). In addition, there is a locking mechanism (31) added to the rotary actuator to lock it to the meat container at each rotation. To rotate the meat container 180 degrees, the rotation cylinder (31) is first lifted upwards, when it reaches the cutting station, the locking is triggered and it is locked to the meat container, and then the movement of the rotation cylinder starts. After the cutting process has been completed and the meat block has been pushed outside (FIG. 21), the rotary actuator starts again, the meat container turns 180 degrees once more and takes its initial position. Then it is unlocked and the cylinder moves downwards, into its initial position as well.

4-Cutting Set

The front sides of the meat blocks are cooked by the movement of the meat container in each cooking station prior to being cut or sliced. The meat container that arrives at the cutting station, is turned 180 degrees with the help of the rotary actuator (31) and is made ready to be cut or sliced. Circular knives (33) that work with pneumatic air have been used for the cutting process. Linear cylindrical actuators are used for vertical movements of the knife (33). The knife makes a bearing movement on both sides. On one side the linear cylinder actuator creates movement and the (34) bearing, while on the other end the linear bearing is used for transport (35). The downward movement of the knife initiates the cutting process. The cut meat is collected on the collection platform (36) that is placed in front of the knife.

Figure 19:
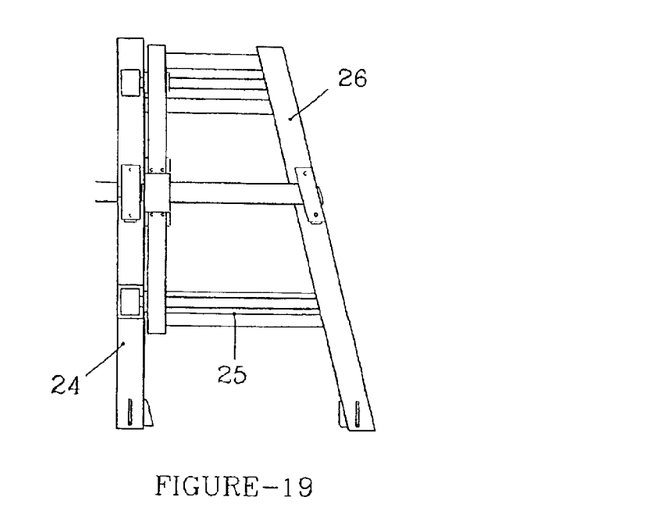
FIG. 19—Shows the pushing piston (24) and the pushing rod (29) at the end of the piston arms with 5–15° inclination.

After the circular knife has finished the cutting process, it returns to the waiting position where it will not hinder the turning of the meat containers. After the cutting process has been finished, the meat block which will have to be cooked and cut, is pushed outside the meat container (23). Therefore after the cutting process has finished, the linear-moving ball screw (24) (FIG. 19) that is connected to the fixed support (29) moves.

The ball screw moves forward to the inclined pushing bar (FIG. 19) (26) that has been attached in front of it, enters into the split which is placed at the rear side of the meat containers and pushes the pushing plate (11) at the far end of the meat block and makes it move out of the container in an increment equal to the meat slice (14) that will be cut. Then the pushing bar (26) returns to its initial position. The container also takes its initial cooking position after turning 180 degrees, with the help of the rotary actuator (31). The rotation unit turns 72 degrees in order to bring the meat container to the cooking station no 1. Meanwhile, the next container will have reached the cutting station and the process will continue this way. After the last slice has been cooked, all the slots of the meat container will remain empty. Then, new meat blocks will be placed in the slots of the container one by one and the process will start.

Figure 16:
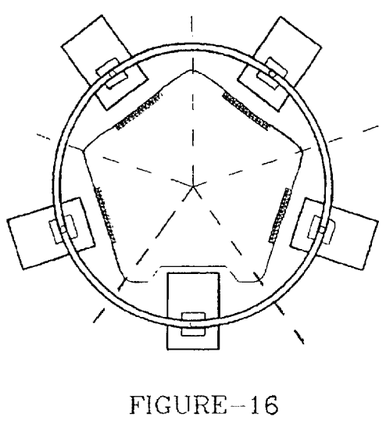
FIG. 16—Shows a top view of a configuration layout of an instrument pentagonally configured with 4 cooker stations and a cutting station without cooker.
Figure 17:
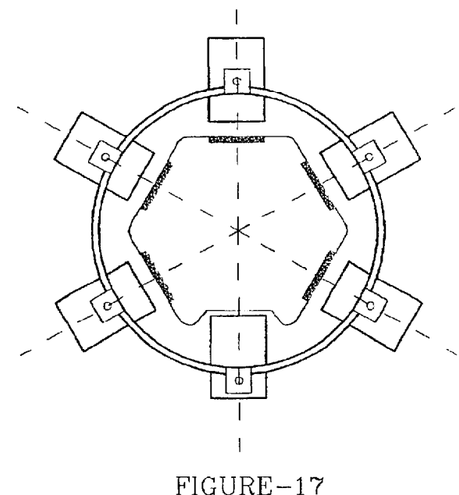
FIG. 17—Shows a top view of a configuration layout of an instrument hexagonally configured with 5 cooker stations and a cutting station without cooker.
Figure 18:
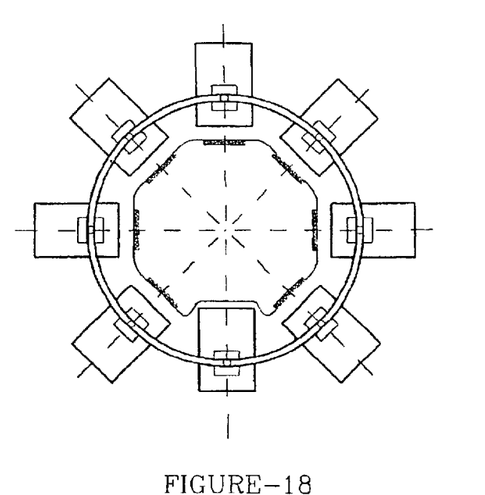
FIG. 18—Shows a top view of a configuration layout of an instrument octagonally configured with 7 cooker stations and a cutting station without cooker.
Figure 26:
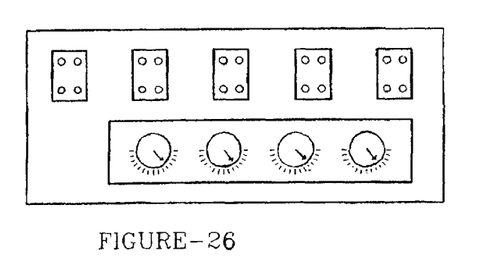
FIG. 26—Shows the central command table.

5-Central Command (Time/Speed/Amount/Process) Table:

It is preferred that the units of the integrated instrument of the invention operate together automatically. However, these are arranged in a way that would facilitate a manual tuning from the Central command table according to the need or desire. Although all process are integrated with each other, each of the rotating process, rotation of the meat box around itself for the cutting process, the cutting process itself and the movement of the knife (33), rotating the meat box again for cooking, adjusting the cooking temperature of each of the cookers separately, is automatically controlled as for operation and time. Thus, it is possible to adjust time and speed for cooking, and as a result the amount. These process stages are directed by the Central command table (FIG. 26).

a) Only the rotating group is operated (FIG. 26). As seen in FIG. 16, an instrument of pentagonal arrangement having 4 cookers and a cutting station without a cooker, is controlled from the central command and tuning table (FIG. 26): each time a button is pressed, the gear group (28) rotating the rotating group makes a "turn". This is a 72 degree rotation. A rotation of 5 slices makes a full circle. The temperature of the cookers during these rotations is controlled by the cooker tuning (FIG. 26) at the command table. If desired, the boxes may be rotated without any cutting, any cooking or cooking at a desired rate, at the desired intervals and for the desired periods.

b) The meat box is kept at the cutting station, without rotating for cutting, for a desired period of time.

c) Although it is rotated for cutting, the meat box is rotated back without cutting, then turned to the other stations.

d) All of these operations are carried out from the command and tuning panel, according to needs and desires.

The present invention is entitled to a range of equivalents, and is to be limited only by the following claims.

List of References 1. meat container
2. upper pin
3. lower pin
4. back side of meat container
5. hole (split) at backside of meat container
6. open front side of meat container
7. angle of the inclination of the meat container
8. vertical axis
9. meat block socket in the interior wall
10. interior wall
11. mobile pushing plate
12. extension parts pushing plate
13. frozen meat block
14. polyamide casing film
15. clips
16. upper frame (table)
17. lower frame
18. linking arms
19. lower seat of the pins
20. upper set of pins
21. linking arms between upper and lower frames
22. cooker
23. cooker meat
24. piston
25. piston arms
26. pushing rods
27. main axis of the rotation set
28. electrical motor
29. fixed main support of the system
30. reduction device
31. rotary actuator
32. locking mechanism
33. circular knife
34. linear bearing
35. linear bearing
36. slice platform
37. knife connection plate

I claim:

1. Integrated Doner cooking and cutting instrument for obtaining cooked ready to serve Doner meat of standard form and cooking degree, comprising:

1) at least one Meat container,
   2) a Cooking group,
   3) a Rotating group,
   4) a Cutting group, and
   5) a Central command table the at least one meat container, arranged and configured to hold at least one meat block, is movable by the rotary group to expose the meat block to the cooking group and cutting group according to inputs at the central command table, the meat container is a prismatic rectangular meat container placed with an inclination according to the vertical axis where the meat block will not drop while the meat block is being cut and an interior wall of the meat container forms a plurality of sockets where the meat blocks are insertable.

2. An integrated Doner cooking and cutting instrument according to claim 1, wherein:

the meat blocks are placed in the meat sockets within the interior wall; and the meat blocks are placed into the meat container so that a front face of the meat container is open.

3. An integrated Doner cooking and cutting instrument according to claim 1, wherein:

the meat blocks are filled-stuffed and clipped into a polyamide packing material prepared at a meat factory.

4. An integrated Doner cooking and cutting instrument according to claim 1, wherein:

a cooking and cutting operation continues until a completion of discharge of meat blocks in each meat container.

5. An integrated Doner cooking and cutting instrument according to claim 1, wherein: a pushing plate which pushes the meat blocks has the same inclination and form as the meat container and that the pushing plate rotates at an upper and a lower part and that the pushing plate has at least one additional horizontal extension part configured to prevent the meat block from dropping.

6. An integrated Doner cooking and cutting instrument according to claim 5, wherein: the pushing plate pushes the meat block out of the socket each time in an adjustable increment.

7. An integrated Doner cooking and cutting instrument according to claim 2, wherein: the meat container has pins that mate with sockets on a lower and an upper frame of the rotating group.

8. An integrated Doner cooking and cutting instrument according to claim 2, wherein: the cooking group is at least one of an liquefied propane gas and an electrical radiant cooker (22) with the same length and inclination as that of the meat container.

9. An integrated Doner cooking and cutting instrument according to claim 8, wherein: a cooking degree of each cooker may be tuned according to the desired cooking degree at the Central command table.

10. An integrated Doner cooking and cutting instrument according to claim 5, wherein: the pushing plate is pushed forward via a piston rod.

11. An integrated Doner cooking and cutting instrument according to claim 7, wherein: there are linking arms where an upper seat of the pins are placed on the rotating group.

12. An integrated Doner cooking and cutting instrument according to claim 1, wherein: in a non-cooker cutting station the meat containers are rotatable 180 degrees around their own axis by a rotary actuator controlled from the central command table.

13. An integrated Doner cooking and cutting instrument according to claim 1, wherein: a motor, an endless screw and gears connected to a fixed main axis are arranged and configured to rotate the rotary group and that these rotations may be directed at the central command table.

14. An integrated Doner cooking and cutting instrument according to claim 1, wherein: a cooked front side of meat blocks in the sockets of the meat container are pushed out of the meat socket in the thickness of one slice and are made ready for cutting.

15. An integrated Doner cooking and cutting instrument according to claim 1, wherein: the cutting group has a unit containing a cutting motor and a circular knife having a rotary movement, and the unit ha linear pneumatic cylinders for up and down movements.

16. An integrated Doner cooking and cutting instrument according to claim 1, wherein: a cooked part of the meat in the container is cut off upon a command given from the Central command table, and automatically following the completion of a slicing operation, the meat container turns around its own axis 180 degrees into a cooking position before the next cooking station whereby an uncooked part of the meat occupies the cooking position.

17. An integrated Doner cooking and cutting instrument according to claim 16, wherein: meat blocks are placed into the sockets after taking a last slice in a non-cooker cutting station, rotating adversely at 180 degrees and bring the meat blocks to the cooking station to start cooking.

18. An integrated Doner cooking and cutting instrument according to claim 17, wherein: the units forming the instrument are in integration and connection with each other and rotation of the meat blocks in the meat container sockets at certain intervals around the cooking group, bringing them into a cutting position before the non-cooker cutting station by turning 180 degrees, positioning and movement of the cutting group for cutting, and the tuning of cookers according to desired degrees and their control is handled one of automatically or manually from the central command table.

* * * * *